United States Patent [19]
L'Ecuyer

[11] Patent Number: 6,134,629
[45] Date of Patent: Oct. 17, 2000

[54] DETERMINING THRESHOLDS AND WRAP-AROUND CONDITIONS IN A FIRST-IN-FIRST-OUT MEMORY SUPPORTING A VARIETY OF READ AND WRITE TRANSACTION SIZES

[75] Inventor: Brian Peter L'Ecuyer, Elk Grove, Calif.

[73] Assignee: Hewlett-Packard Company, Palo Alto, Calif.

[21] Appl. No.: 09/015,415

[22] Filed: Jan. 29, 1998

[51] Int. Cl.[7] ...................................................... G06F 12/02
[52] U.S. Cl. .............................. 711/110; 711/219; 710/50; 365/221
[58] Field of Search .................................... 711/110, 217, 711/218, 219; 710/52; 365/221

[56] References Cited

U.S. PATENT DOCUMENTS

| | | | |
|---|---|---|---|
| 4,839,866 | 6/1989 | Ward et al. ............................ | 365/221 |
| 4,891,788 | 1/1990 | Kreifels ................................. | 365/49 |
| 5,668,767 | 9/1997 | Barringer .............................. | 365/221 |

*Primary Examiner*—Hiep T. Nguyen

[57] ABSTRACT

Data is read from a first-in-first-out (FIFO) queue. A first condition flag is generated which indicates whether a read transaction of a first transaction size may be performed. When a write address for the FIFO queue is greater than a read address for the FIFO queue, the first condition flag is set to true when the read address plus the first transaction size is less than or equal to the write address. When the write address for the FIFO queue is less than the read address for the FIFO queue, the first condition flag is set to true when the read address plus the first transaction size is less than the write address plus a maximum depth of the FIFO queue. A first read transaction of the first transaction size from the FIFO queue is performed only when the first condition flag is true.

11 Claims, 7 Drawing Sheets

DETERMINING THRESHOLDS AND WRAP-AROUND CONDITIONS IN A FIRST-IN-FIRST-OUT MEMORY SUPPORTING A VARIETY OF READ AND WRITE TRANSACTION SIZES

BACKGROUND

The present invention concerns management of storage devices and pertains particularly to determining thresholds and wrap-around conditions in a first-in-first-out memory.

A first-in-first-out memory is a memory in which data is read out of the memory in the order in which the data is placed in the memory. FIFO memories are thus well suited for uses such as buffering data in a network controller.

When implementing a dual port memory as a circular first-in-first-out (FIFO) queue, a designer must choose a finite memory depth. When using the FIFO queue, firmware or software keeps track of a write address (a location where additional data is to be next written into the FIFO queue) and a read address (a location where data is to be next read from the FIFO queue). In addition certain conditions are also monitored. These conditions include, for example, whether the FIFO queue is full (i.e., no more data should be written into the FIFO queue before some data is read out of the FIFO queue), empty (i.e., no more data should be read out of the FIFO queue before more data is written into the FIFO queue), or a threshold has been crossed (e.g., a certain threshold of bytes have been written into the FIFO queue so that reads are allowed to be made out of the FIFO queue).

The full condition and the empty condition can determined by comparing the write address to the read address. However because the FIFO queue has a finite length, this introduces a certain complexity in the comparison. This is because any comparison must take into consideration that both the read address and the write address at times wrap around so as to return to the first address. This wrap around can be especially complex for an application in which it is required to determine whether a certain quantity of data is available to be read out of the FIFO queue.

SUMMARY OF THE INVENTION

In accordance with the preferred embodiment of the present invention, data is read from a first-in-first-out (FIFO) queue. A first condition flag is generated which indicates whether a read transaction of a first transaction size may be performed. When a write address for the FIFO queue is greater than a read address for the FIFO queue, the first condition flag is set to true when the read address plus the first transaction size is less than or equal to the write address. When the write address for the FIFO queue is less than the read address for the FIFO queue, the first condition flag is set to true when the read address plus the first transaction size is less than the write address plus a maximum depth of the FIFO queue. A first read transaction of the first transaction size from the FIFO queue is performed only when the first condition flag is true.

For example, the first transaction size is sixteen bytes, eight bytes or one byte.

Additional condition flags may be used for other transaction sizes. For example, a second condition flag is generated which indicates whether a read transaction of a second transaction size may be performed. When the write address for the FIFO queue is greater than the read address for the FIFO queue, the second condition flag is set to true when the read address plus the second transaction size is less than or equal to the write address. When the write address for the FIFO queue is less than the read address for the FIFO queue, the second condition flag is set to true when the read address plus the second transaction size is less than the write address plus the maximum depth of the FIFO queue. The second read transaction of the second transaction size from the FIFO queue is performed only when the second condition flag is true.

The present invention also is used to write data to a first-in-first-out (FIFO) queue. A first write condition flag is generated which indicates whether a write transaction of a first transaction size may be performed. When a read address for the FIFO queue is greater than a write address for the FIFO queue, the first write condition flag is set to true when the write address plus the first transaction size is less than or equal to the read address. When the read address for the FIFO queue is less than the write address for the FIFO queue, the first write condition flag is set to true when the write address plus the first transaction size is less than the read address plus a maximum depth of the FIFO queue. A first write transaction of the first transaction size from the FIFO queue is performed only when the first write condition flag is true.

The present invention provides for an efficient solution to predicting whether multiple byte accesses from a FIFO queue will be successful.

DESCRIPTION OF THE PREFERRED EMBODIMENT

Figure 1:
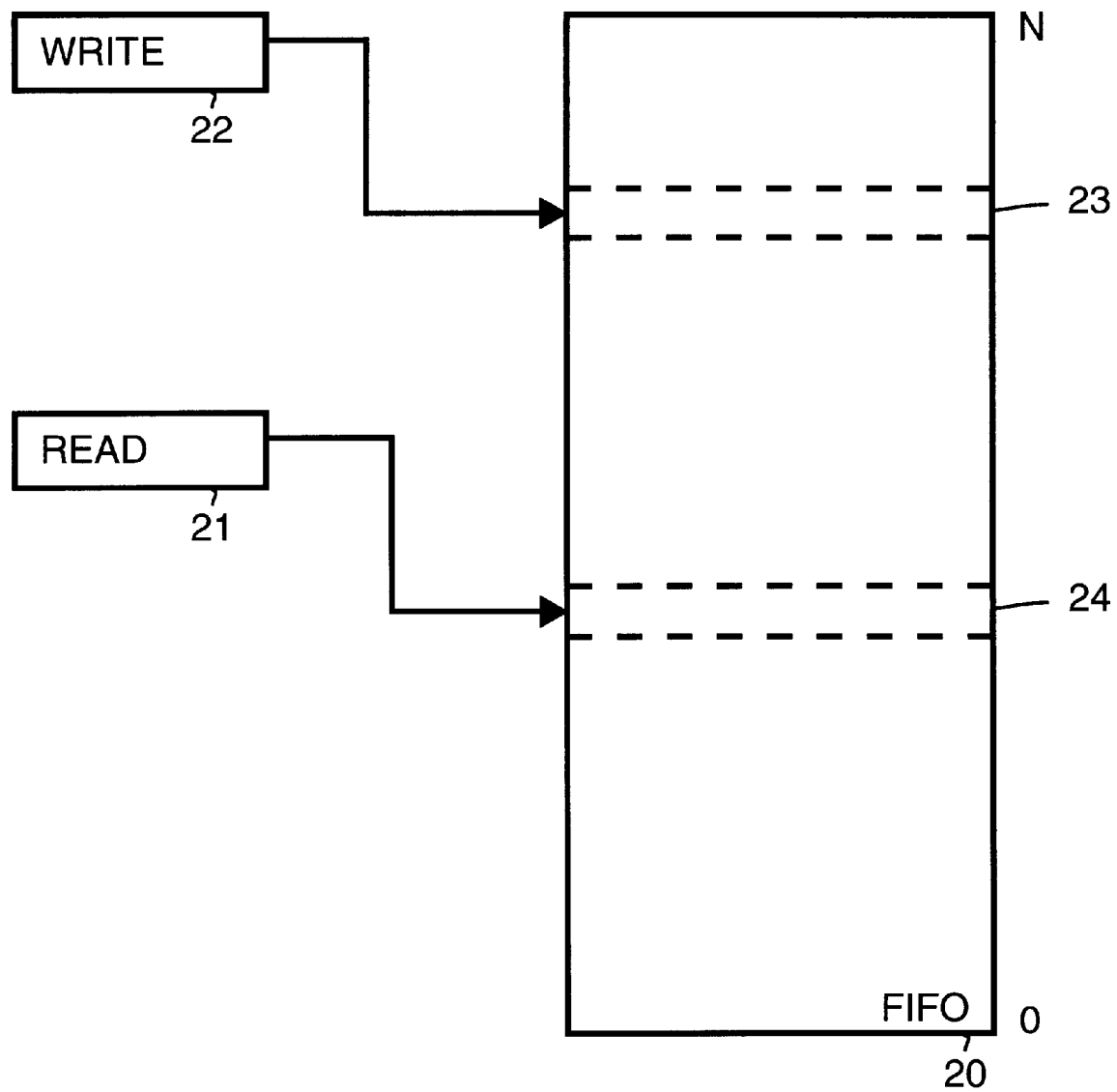
FIG. 1 is a simplified block diagram which shows a first-in-first-out (FIFO) queue, a register which holds a read address and a register which holds a write address in accordance with a preferred embodiment of the present invention.

FIG. 1 is a simplified block diagram which shows a first-in-first-out (FIFO) queue 20. FIFO queue 20 has, for example, a memory depth of N+1, words. This is illustrated in FIG. 1 by FIFO queue 20 having memory locations from 0 to N. In one embodiment of the present invention, each location contains one byte of data and the memory depth is 128. As is understood by persons the amount of data stored by each location and the memory depth varies for other embodiments of the present invention.

A write register 22 holds a write address. The write address is a location 23 within FIFO queue 20 where the next write into FIFO queue 20 is to be performed. A read register 21 holds a read address. The read address is a location 24 within FIFO queue 20 where the next read from FIFO queue 20 is to be performed.

In the preferred embodiment, successive locations of a known amount are read in a single transaction. In the preferred embodiment, three levels exist: 1 byte available, eight bytes available and sixteen bytes available. This allows a burst read of either one, eight or sixteen bytes.

In order to allow the system to track what size read transactions may be performed, three additional condition flags are monitored for a read. The condition AVAIL16 is true when there are sixteen bytes available to be read out of the FIFO queue. The condition AVAIL8 is true when there are eight bytes available to be read out of the FIFO queue. The condition AVAIL1 is true when there is one byte available to be read out of the FIFO queue. The AVAIL1 has a value which is the inverse of the EMPTY flag.

In general, in order to generate each of these additional flags, it is important to determine whether the write address (W) is greater than or equal to the read address (R). If the write address (W) is greater than or equal to the read address (R), then the condition flag for a particular transfer size (TS) is true when the read address (R) plus the transfer size (TS) is less than or equal to the write address.

Thus, for example, when the transfer size (TS) is 16 bytes, then AVAIL16 is true when the read address (R) plus the transfer size (16) is less than or equal to the write address (W). This is illustrated by Formula 1 below:

$$\text{AVAIL16} = (R+16 <= W) \qquad \text{Formula 1}$$

When the transfer size (TS) is 8 bytes, then AVAIL8 is true when the read address (R) plus the transfer size (8) is less than or equal to the write address (W). This is illustrated by Formula 2 below:

$$\text{AVAIL8} = (R+8 <= W) \qquad \text{Formula 2}$$

When the transfer size (TS) is 1 byte, then AVAIL1 is true when the read address (R) plus the transfer size (1) is less than or equal to the write address (W). This is illustrated by Formula 3 below:

$$\text{AVAIL1} = (R+1 <= W) \qquad \text{Formula 3}$$

If the write address (W) is less than the read address (R), than the condition flag for a particular transfer size (TS) is true when the read address (R) plus the transfer size (TS) is less than the write address (W) plus the maximum depth of the FIFO queue.

Thus, for example, when FIFO queue size is 128 bytes and the transfer size (TS) is 16 bytes, then AVAIL16 is true when the read address (R) plus the transfer size (16) is less than the write address (W) plus the FIFO queue size (128). This is illustrated by Formula 4 below:

$$\text{AVAIL16} = (R+16 < W+128) \qquad \text{Formula 4}$$

When FIFO queue size is 128 bytes and the transfer size (TS) is 8 bytes, then AVAIL8 is true when the read address (R) plus the transfer size (8) is less than the write address (W) plus the FIFO queue size (128). This is illustrated by Formula 5 below:

$$\text{AVAIL8} = (R+8 < W+128) \qquad \text{Formula 5}$$

When FIFO queue size is 128 bytes and the transfer size (TS) is 1 byte, then AVAIL1 is true when the read address (R) plus the transfer size (1) is less than the write address (W) plus the FIFO queue size (128). This is illustrated by Formula 6 below:

$$\text{AVAIL1} = (R+1 < W+128) \qquad \text{Formula 6}$$

AVAIL1 can also be calculated as being the inverse of the empty flag.

Additionally, in the preferred embodiment, successive locations of a known amount are written in a single transaction. In the preferred embodiment, three levels exist: 1 byte available, eight bytes available and sixteen bytes available. This allows a burst write of either one, eight or sixteen bytes.

In order to allow the system to track what size write transactions may be performed, three additional condition flags are monitored for a write. The condition AVAILW16 is true when there is room for sixteen bytes to be written into the FIFO queue. The condition AVAILW8 is true when there is room for eight bytes to be written into the FIFO queue. The condition AVAILW1 is true when there is room for one byte to be written into the FIFO queue. The AVAILW1 has a value which is the inverse of the FULL flag.

In general, in order to generate each of these additional flags, it is important to determine whether the read address (R) is greater than or equal to the write address (W). If the read address (R) is greater than or equal to the write address (W), then the condition flag for a particular transfer size (TS) is true when the write address (W) plus the transfer size (TS) is less than or equal to the read address.

Thus, for example, when the transfer size (TS) is 16 bytes, then AVAILW16 is true when the write address (W) plus the transfer size (16) is less than or equal to the read address (R). This is illustrated by Formula 7 below:

$$\text{AVAILW16} = (W+16 <= R) \qquad \text{Formula 7}$$

When the transfer size (TS) is 8 bytes, then AVAILW8 is true when the write address (W) plus the transfer size (8) is less than or equal to the read address (R). This is illustrated by Formula 2 below:

$$\text{AVAILW8} = (W+8 <= R) \qquad \text{Formula 8}$$

When the transfer size (TS) is 1 byte, then AVAILW1 is true when the write address (W) plus the transfer size (1) is less than or equal to the read address (R). This is illustrated by Formula 9 below:

$$\text{AVAILW1} = (W+1 <= R) \qquad \text{Formula 9}$$

If the read address (R) is less than the write address (W), than the condition flag for a particular transfer size (TS) is true when the write address (W) plus the transfer size (TS) is less than the read address (R) plus the maximum depth of the FIFO queue.

Thus, for example, when FIFO queue size is 128 bytes and the transfer size (TS) is 16 bytes, then AVAILW16 is true when the write address (W) plus the transfer size (16) is less than the read address (R) plus the FIFO queue size (128). This is illustrated by Formula 10 below:

$$\text{AVAILW16} = (W+16 < R+128) \qquad \text{Formula 10}$$

When FIFO queue size is 128 bytes and the transfer size (TS) is 8 bytes, then AVAILW8 is true when the write address (W) plus the transfer size (8) is less than the read address (R) plus the FIFO queue size (128). This is illustrated by Formula 1 below:

$$\text{AVAILW8} = (W+8 < R+128) \qquad \text{Formula 11}$$

When FIFO queue size is 128 bytes and the transfer size (TS) is 1 byte, then AVAILW1 is true when the write address (W) plus the transfer size (1) is less than the read address (R) plus the FIFO queue size (128). This is illustrated by Formula 12 below:

$$AVAILW1=(W+1<R+128) \qquad \text{Formula 12}$$

AVAILW1 can also be calculated as being the inverse of the full flag.

The Figures below include flowcharts which illustrate a system where the additional condition flags are used.

Figure 2:
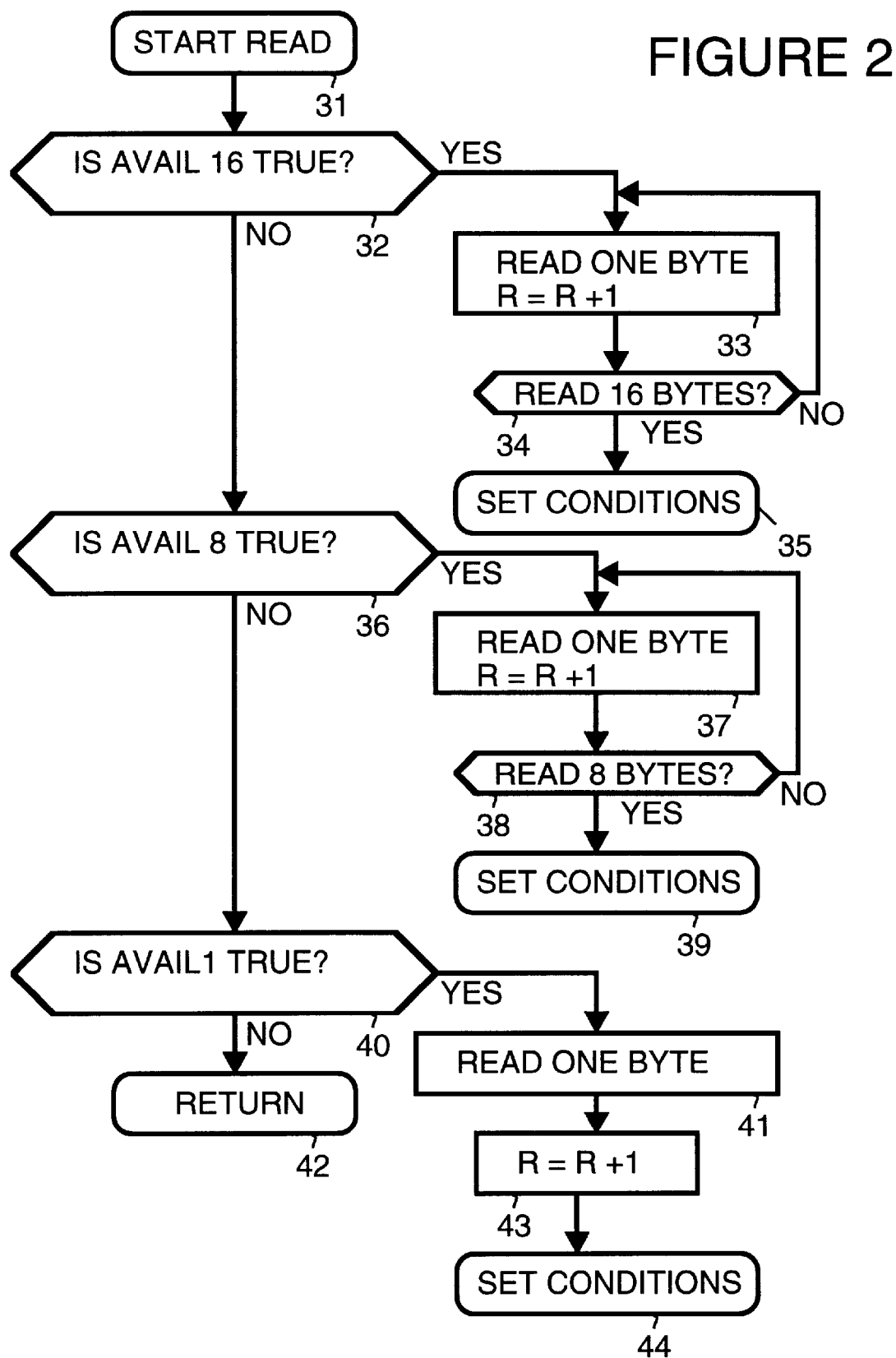
FIG. 2 is a simplified flow chart which illustrates a read operation from a first-in-first-out (FIFO) queue, in accordance with a preferred embodiment of the present invention.

FIG. 2 is a simplified flow chart which illustrates a read operation from a first-in-first-out (FIFO) queue. In a step 31, the read is started. In a step 32, a check is made to see if AVAIL16 is true. The condition AVAIL16 is true when there are sixteen bytes available in the FIFO queue. If in step 32, AVAIL16 is true, then in a step 33 and a step 34 a sixteen byte burst read is performed. In step 33 one byte is read and the read address (R) is incremented. Step 34 causes step 33 to repeat until sixteen bytes have been transferred and the read address (R) is incremented 16 times. In a step 35, the conditions for a read are set. This is illustrated by the flowchart in FIG. 3. Also the conditions for a write are set. This is illustrated by the flowchart in FIG. 4.

If in step 32, AVAIL16 is false, in a step 36 a check is made to see if AVAIL8 is true. The condition AVAIL8 is true when there are eight bytes available in the FIFO queue. If in step 36, AVAIL8 is true, then in a step 37 and a step 38 an eight byte burst read is performed. In step 37 one byte is read and the read address (R) is incremented. Step 38 causes step 37 to repeat until eight bytes have been transferred and the read address (R) is incremented eight times. In a step 39, the conditions for a read are set. This is illustrated by the flowchart in FIG. 3. Also the conditions for a write are set. This is illustrated by the flowchart in FIG. 4.

If in step 36, AVAIL8 is false, in a step 40 a check is made to see if AVAIL1 is true. The condition AVAIL1 is true when there is one byte available in the FIFO queue. If in step 40, AVAIL1 is true, then in a step 41 a one byte read is performed. In a step 43, the read address (R) is incremented one time which takes into account the one byte read from the FIFO queue. In a step 44, the conditions for a read are set. This is illustrated by the flowchart in FIG. 3. Also the conditions for a write are set. This is illustrated by the flowchart in FIG. 4.

If in step 40, AVAIL1 is false, in a step 42, a return is made without performing a read.

Figure 3:
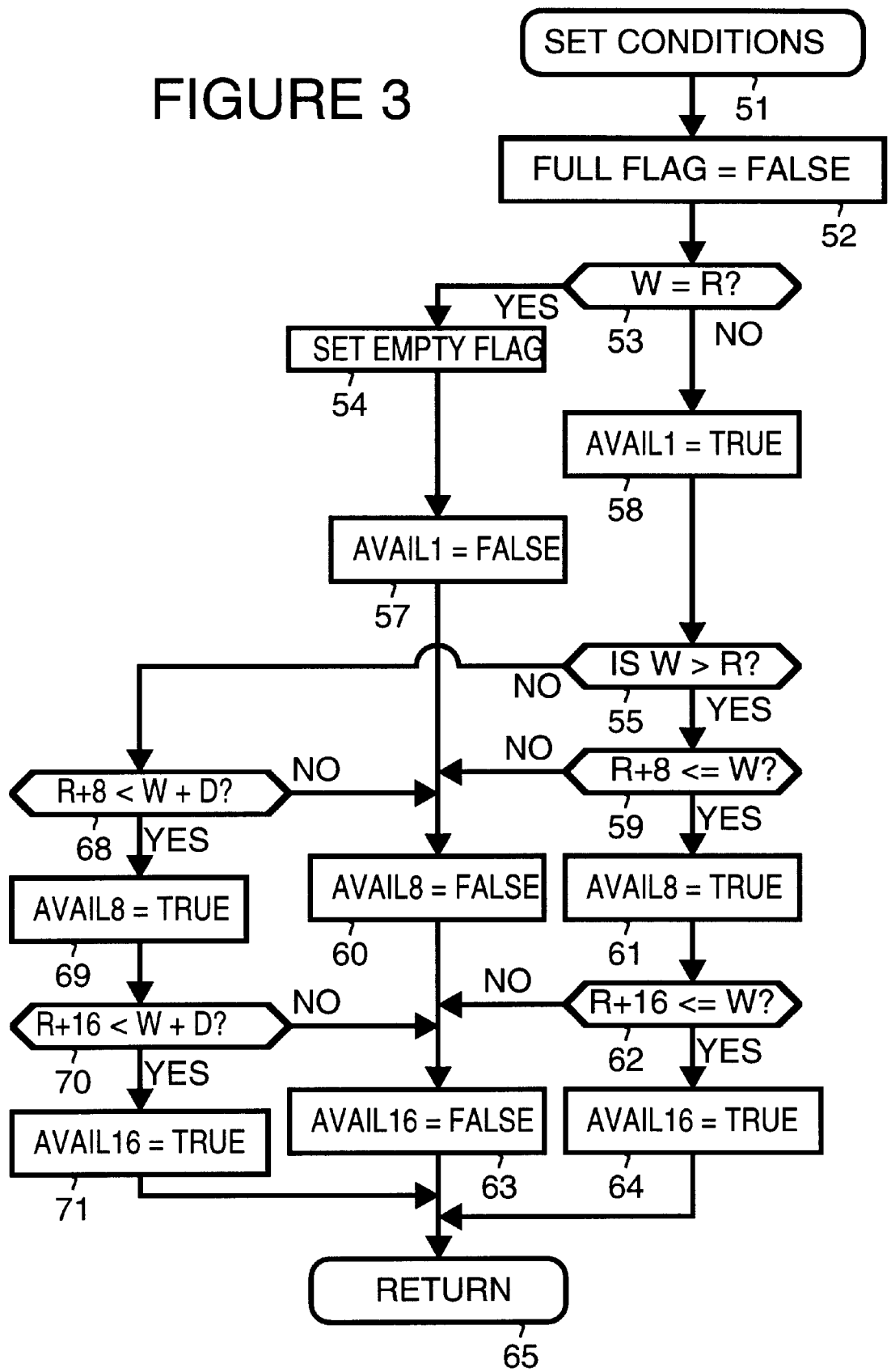
FIG. 3 is a simplified flow chart which illustrates setting conditions after a read operation from a first-in-first-out (FIFO) queue, in accordance with a preferred embodiment of the present invention.

FIG. 3 is a simplified flow chart which illustrates setting read conditions after a read operation from a first-in-first-out (FIFO) queue. In a step 51, the algorithm begins. In a step 52, the full flag is set to false. In a step 53, a check is made to see whether the write address (W) is equal to the read address (R). If so, in a step 54 the empty flag is set to true. In a step 57, AVAIL1 is set equal to false. Since the empty flag will always have the inverse value of AVAIL1, it is possible to eliminate one or the other flag from the system.

If in step 53 the write address (W) is not equal to the read address (R), in a step 58, AVAIL1 is set to true.

In a step 55, a check is made to see if the write address (W) is greater than the read address (R). If so, in a step 59, a comparison is made to see if R+8 is less than or equal to W. If not, in a step 60, AVAIL8 is set equal to false. If in step 59, R+8 is less than or equal to W, in a step 61, AVAIL8 is set to true.

In a step 62, a comparison is made to see if R+16 is less than or equal to W. If not, in a step 63, AVAIL16 is set equal to false. If in step 62, R+16 is less than or equal to W, in a step 64, AVAIL16 is set to true.

If in step 55, the write address (W) is not greater than the read address (R), in a step 68, a comparison is made to see if the read (R) address plus 8 is less than the write address (W) plus the maximum depth of the FIFO queue (D). If not, in step 60, AVAIL8 is set equal to false. If in step 68, R+8 is less than W+D, in a step 69, AVAIL8 is set to true.

In a step 70, a comparison is made to see if R+16 is less than W+D. If not, in step 63, AVAIL16 is set equal to false. If in step 70, R+16 is less than W+D, in a step 71, AVAIL16 is set to true. In a step 65, the algorithm is completed.

Figure 4:
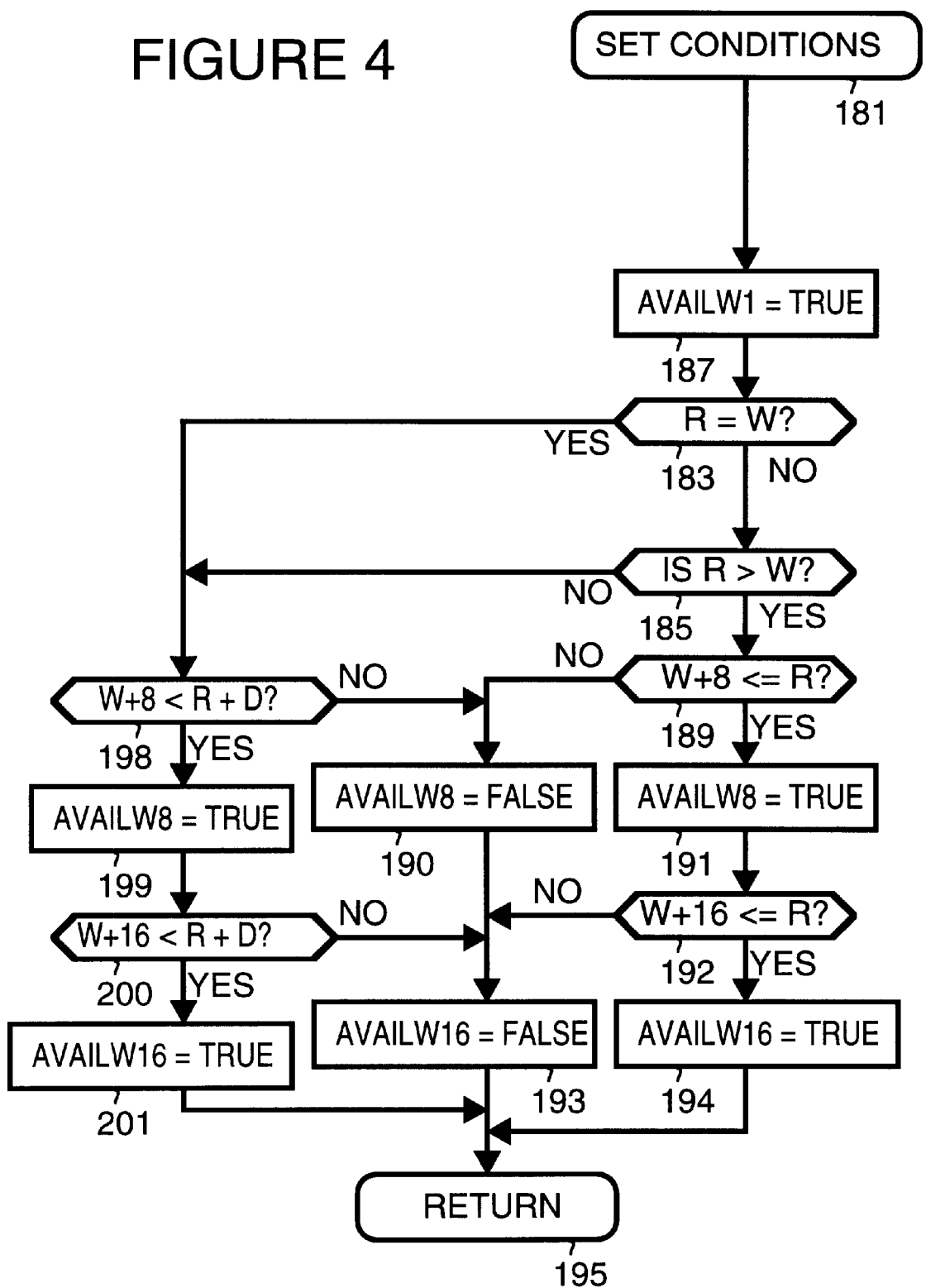
FIG. 4 is a simplified flow chart which illustrates a write operation from a first-in-first-out (FIFO) queue, in accordance with a preferred embodiment of the present invention.

FIG. 4 is a simplified flow chart which illustrates setting write conditions after a read operation into a first-in-first-out (FIFO) queue. In a step 181, the algorithm begins. In a step 187, AVAILW1 is set equal to true. In a step 183, a check is made to see whether the read address (R) is equal to the write address (W). If so, in a step 185, a check is made to see if the read address (R) is greater than the write address (W). If so, in a step 189, a comparison is made to see if W+8 is less than or equal to R. If not, in a step 190, AVAILW8 is set equal to false. If in step 189, W+8 is less than or equal to R, in a step 191, AVAILW8 is set to true.

In a step 192, a comparison is made to see if W+16 is less than or equal to R. If not, in a step 193, AVAILW16 is set equal to false. If in step 192, W+16 is less than or equal to R, in a step 194, AVAILW16 is set to true.

If in step 283 the read address is equal to the write address, or in step 185, the read address (R) is not greater than the write address (W), in a step 198, a comparison is made to see if W+8 is less than R+D. If not, in step 190, AVAILW8 is set equal to false. If in step 198, W+8 is less than R+D, in a step 199, AVAILW8 is set to true.

In a step 200, a comparison is made to see if W+16 is less than R+D. If not, in step 193, AVAILW16 is set equal to false. If in step 200, W+16 is less than R+D, in a step 201, AVAILW16 is set to true. In a step 195, the algorithm is completed.

Figure 5:
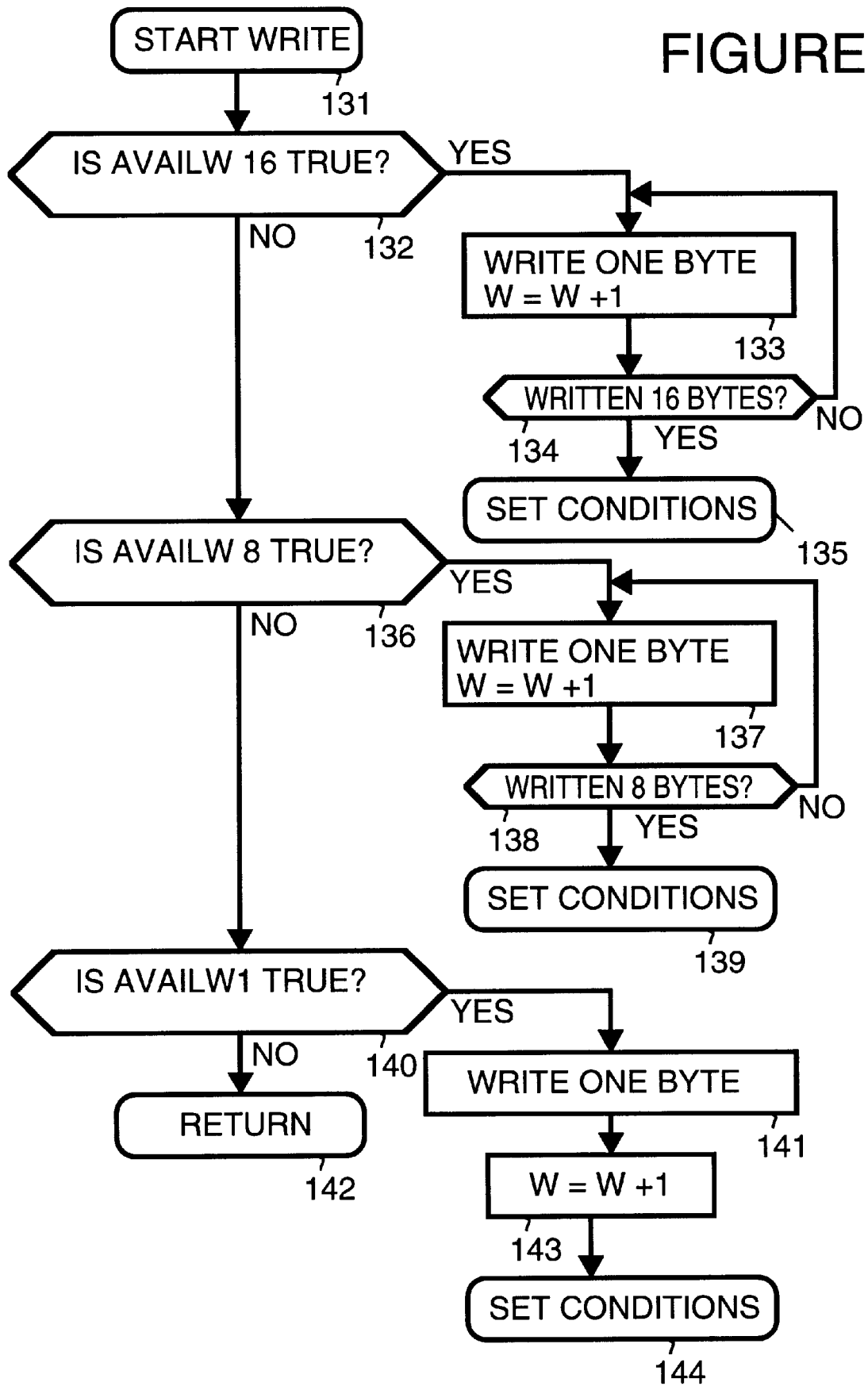
FIG. 5 is a simplified flow chart which illustrates setting conditions after a write operation from a first-in-first-out (FIFO) queue, in accordance with a preferred embodiment of the present invention.

FIG. 5 is a simplified flow chart which illustrates a write operation from a first-in-first-out (FIFO) queue. In a step 131, the write is started. In a step 132, a check is made to see if AVAILW16 is true. The condition AVAILW16 is true when there are sixteen bytes available to be written in the FIFO queue. If in step 132, AVAILW16 is true, then in a step 133 and a step 134 a sixteen byte burst write is performed. In step 133 one byte is written and the write address (W) is incremented. Step 134 causes step 133 to repeat until sixteen bytes have been transferred and the write address (W) is incremented 16 times. In a step 135, the conditions for a write are set. This is illustrated by the flowchart in FIG. 6. Also the conditions for a read are set. This is illustrated by the flowchart in FIG. 7.

If in step 132, AVAILW16 is false, in a step 136 a check is made to see if AVAILW8 is true. The condition AVAILW8 is true when there are eight bytes available to be written in the FIFO queue. If in step 136, AVAILW8 is true, then in a step 137 and a step 138 an eight byte burst write is performed. In step 137 one byte is written and the write address (W) is incremented. Step 138 causes step 137 to repeat until eight bytes have been transferred and the write address (W) is incremented eight times. In a step 139, the conditions for a write are set. This is illustrated by the flowchart in FIG. 6. Also the conditions for a read are set. This is illustrated by the flowchart in FIG. 7.

If in step 136, AVAILW8 is false, in a step 140 a check is made to see if AVAILW1 is true. The condition AVAILW1 is true when there is one byte available to be written in the FIFO queue. If in step 140, AVAILW1 is true, then in a step 141 a one byte write is performed. In a step 143, the write address (W) is incremented one time which takes into account the one byte write from the FIFO queue. In a step 144, the conditions for a write are set. This is illustrated by the flowchart in FIG. 6. Also the conditions for a read are set. This is illustrated by the flowchart in FIG. 7.

If in step 140, AVAILW1 is false, in a step 142, a return is made without performing a write.

Figure 6:
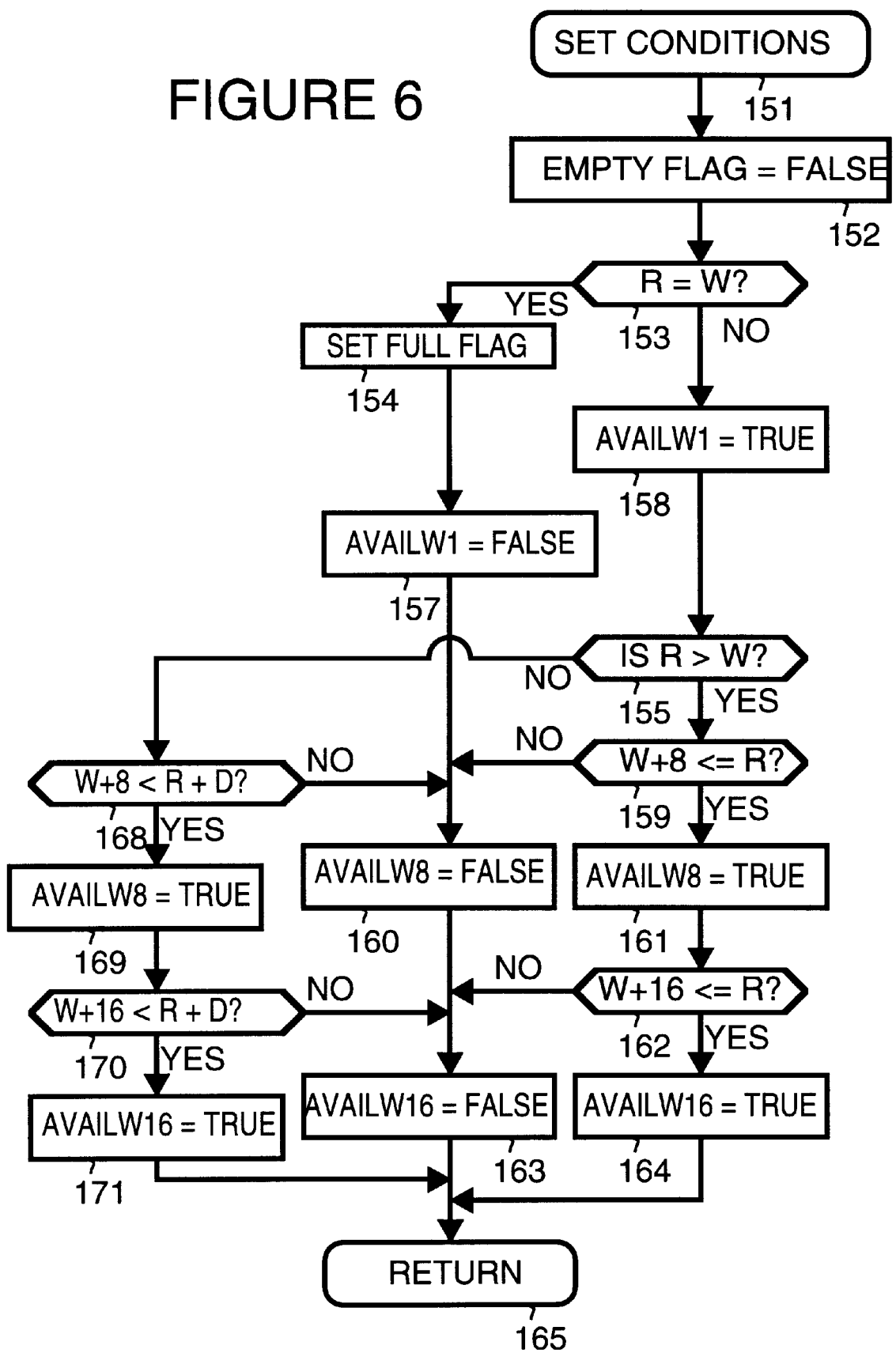

FIG. 6 is a simplified flow chart which illustrates setting write conditions after a write operation from a first-in-first-out (FIFO) queue. In a step 151, the algorithm begins. In a step 152, the empty flag is set to false. In a step 153, a check is made to see whether the read address (R) is equal to the write address (W). If so, in a step 154 the full flag is set to true. In a step 157, AVAILW1 is set equal to false. Since the empty flag will always have the inverse value of AVAILW1, it is possible to eliminate one or the other flag from the system.

If in step 153 the read address (R) is not equal to the write address (W), in a step 158, AVAILW1 is set to true.

In a step 155, a check is made to see if the read address (R) is greater than the write address (W). If so, in a step 159, a comparison is made to see if W+8 is less than or equal to R. If not, in a step 160, AVAILW8 is set equal to false. If in step 159, W+8 is less than or equal to R, in a step 161, AVAILW8 is set to true.

In a step 162, a comparison is made to see if W+16 is less than or equal to R. If not, in a step 163, AVAILW16 is set equal to false. If in step 162, W+16 is less than or equal to R, in a step 164, AVAILW16 is set to true.

If in step 155, the read address (R) is not greater than the write address (W), in a step 168, a comparison is made to see if the write (W) address plus 8 is less than the read address (R) plus the maximum depth of the FIFO queue (D). If not, in step 160, AVAILW8 is set equal to false. If in step 168, W+8 is less than R+D, in a step 169, AVAILW8 is set to true.

In a step 170, a comparison is made to see if W+16 is less than R+D. If not, in step 163, AVAILW16 is set equal to false. If in step 170, W+16 is less than R+D, in a step 171, AVAILW16 is set to true. In a step 165, the algorithm is completed.

Figure 7:
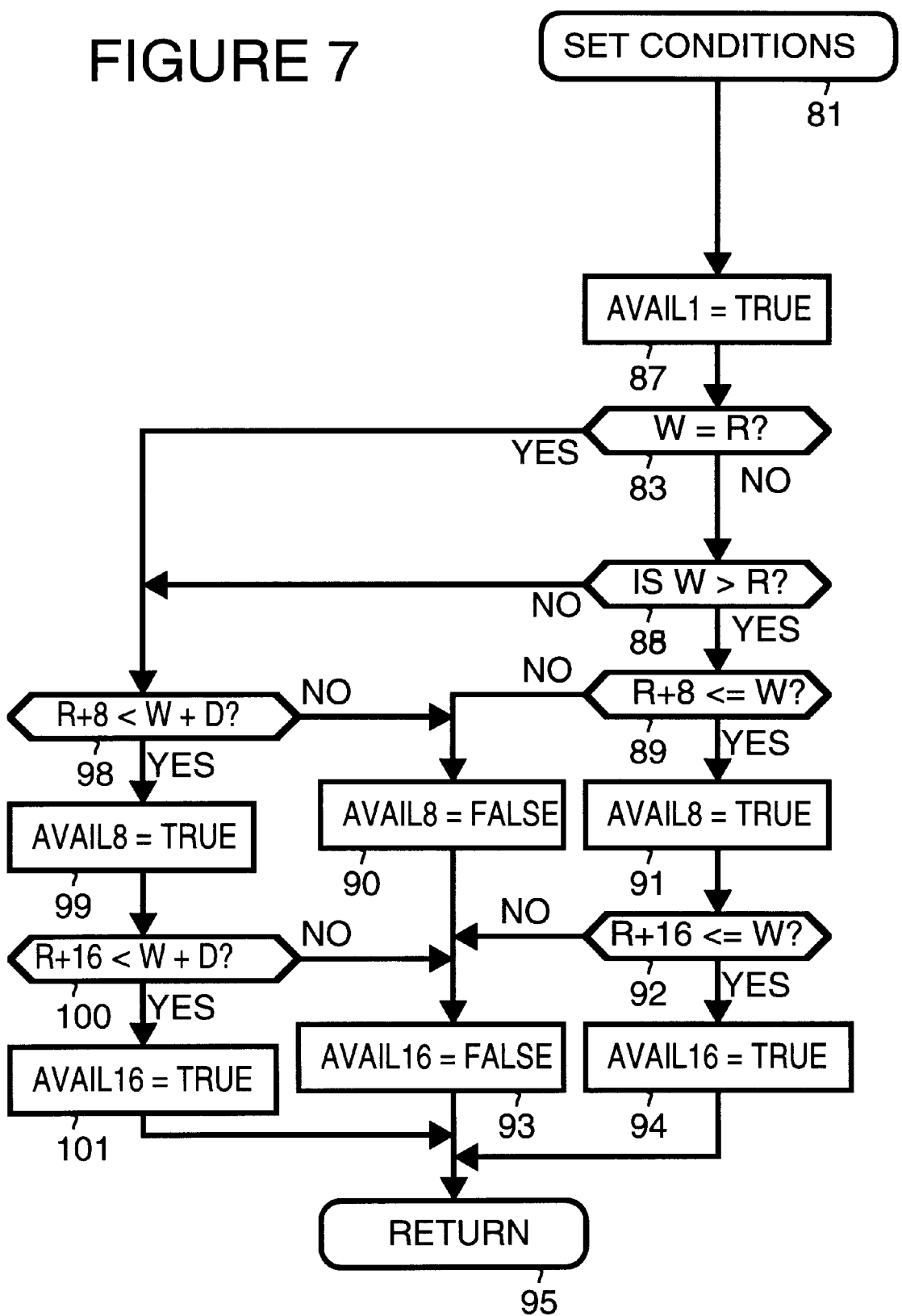

FIG. 7 is a simplified flow chart which illustrates setting conditions for AVAIL1, AVAIL8 and AVAIL16 after a write operation into a first-infirst-out (FIFO) queue. In a step 81, the algorithm begins. In a step 87, AVAIL1 is set equal to true. In a step 83, a check is made to see whether the write address (W) is equal to the read address (R). If so, in a step 88, a check is made to see if the write address (W) is greater than the read address (R). If so, in a step 89, a comparison is made to see if R+8 is less than or equal to W. If not, in a step 90, AVAIL8 is set equal to false. If in step 89, R+8 is less than or equal to W, in a step 91, AVAIL8 is set to true.

In a step 92, a comparison is made to see if R+16 is less than or equal to W. If not, in a step 93, AVAIL16 is set equal to false. If in step 92, R+16 is less than or equal to W, in a step 94, AVAIL16 is set to true.

If in step 83 the write address (W) equals the read address (R) or in step 88, the write address (W) is not greater than the read address (R), in a step 98, a comparison is made to see if R+8 is less than W+D. If not, in step 90, AVAIL8 is set equal to false. If in step 98, R+8 is less than W+D, in a step 99, AVAIL8 is set to true.

In a step 100, a comparison is made to see if R+16 is less than W+D. If not, in step 93, AVAIL16 is set equal to false. If in step 100, R+16 is less than W+D, in a step 101, AVAIL16 is set to true. In a step 95, the algorithm is completed.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for transferring data in a first-in-first-out (FIFO) queue using a variety of transaction sizes, the method comprising the following steps:

(a) generating a plurality of condition flags, each condition flag indicating whether a read transaction of a particular transaction size may be performed, including the following substeps:

(a.1) generating a first condition flag that indicates when read transactions of a first transaction size may be performed, wherein the first transaction size does not equal zero, and, (a.2) generating a second condition flag that indicates when read transactions of a second transaction size may be performed, wherein the second transaction size does not equal zero and does not equal the first transaction size; and, (b) implementing read transactions of the first transaction size to the FIFO queue but only when the first condition flag is true; and, (c) implementing read transactions of the second transaction size to the FIFO queue but only when the second condition flag is true.

2. A method as in claim 1 wherein step (a) additionally comprises the following substep:

(a.3) generating a third condition flag that indicates when read transactions of a third transaction size may be performed, wherein the third transaction size does not equal zero, does not equal the first transaction size and does not equal the second transaction size.

3. A method as in claim 2 additionally comprising the following step:

(d) implementing read transactions of the third transaction size to the FIFO queue but only when the third condition flag is true.

4. A method as in claim 1 wherein:

in substep (a.1):

when a write address for the FIFO queue is greater than a read address for the FIFO queue, setting the first condition flag to true when the read address plus the first transaction size is less than or equal to the write address, and when the write address for the FIFO queue is less than the read address for the FIFO queue, setting the first condition flag to true when the read address plus the first transaction size is less than the write address plus a maximum depth of the FIFO queue; and, in substep (a.2)

when the write address for the FIFO queue is greater than the read address for the FIFO queue, setting the second condition flag to true when the read address plus the second transaction size is less than or equal to the write address, and when the write address for the FIFO queue is less than the read address for the FIFO queue, setting the second condition flag to true when the read address plus the second transaction size is less than the write address plus the maximum depth of the FIFO queue.

5. A method for transferring data in a first-in-first-out (FIFO) queue using a variety of transaction sizes, the method comprising the following steps:
- (a) generating a plurality of condition flags, each condition flag indicating whether a write transaction of a particular transaction size may be performed, including the following substeps:
  - (a.1) generating a first condition flag that indicates when write transactions of a first transaction size may be performed, wherein the first transaction size does not equal zero, and,
  - (a.2) generating a second condition flag that indicates when write transactions of a second transaction size may be performed, wherein the second transaction size does not equal zero and does not equal the first transaction size; and,
- (b) implementing write transactions of the first transaction size from the FIFO queue but only when the first condition flag is true; and,
- (c) implementing write transactions of the second transaction size from the FIFO queue but only when the second condition flag is true.

6. A method as in claim 5 wherein step (a) additionally comprises the following substep:
- (a.3) generating a third condition flag that indicates when write transactions of a third transaction size may be performed, wherein the third transaction size does not equal zero, does not equal the first transaction size and does not equal the second transaction size.

7. A method as in claim 6 additionally comprising the following step:
- (d) implementing write transactions of the third transaction size from the FIFO queue but only when the third condition flag is true.

8. A method as in claim 5 wherein:

in substep (a.1):
  when a read address for the FIFO queue is greater than a write address for the FIFO queue, setting the first condition flag to true when the write address plus the first transaction size is less than or equal to the read address, and
  when the read address for the FIFO queue is less than the write address for the FIFO queue, setting the first condition flag to true when the write address plus the first transaction size is less than the read address plus a maximum depth of the FIFO queue; and, in substep (a.2)
  when the read address for the FIFO queue is greater than the write address for the FIFO queue, setting the second condition flag to true when the write address plus the second transaction size is less than or equal to the read address, and
  when the read address for the FIFO queue is less than the write address for the FIFO queue, setting the second condition flag to true when the write address plus the second transaction size is less than the read address plus the maximum depth of the FIFO queue.

9. A method as in claim 5 additionally comprising the following steps:
- (d) generating a plurality of read condition flags, each read condition flag indicating whether a read transaction of a particular transaction size may be performed, including the following substeps:
  - (d.1) generating the first read condition flag that indicates when read transactions of a first transaction size may be performed, wherein the first transaction size does not equal zero, and,
  - (d.2) generating a second read condition flag that indicates when read transactions of the second transaction size may be performed, wherein the second transaction size does not equal zero and does not equal the first transaction size; and,
- (e) implementing read transactions of the first transaction size to the FIFO queue but only when the first read condition flag is true; and,
- (f) implementing read transactions of the second transaction size to the FIFO queue but only when the second read condition flag is true.

10. A method as in claim 9 wherein step (d) additionally comprises the following substep:
- (d.3) generating a third read condition flag that indicates when read transactions of a third transaction size may be performed, wherein the third transaction size does not equal zero, does not equal the first transaction size and does not equal the second transaction size.

11. A method as in claim 9 additionally comprising the following step:
- (g) implementing read transactions of the third transaction size to the FIFO queue but only when the third read condition flag is true.

* * * * *